Feb. 14, 1950   C. W. RAINEY   2,497,272
CREST VOLTMETER
Filed Feb. 19, 1947

C. W. RAINEY
INVENTOR.

BY
E. C. McRae
R. G. Harris
J. R. Faulkner
T. H. Oster
ATTORNEYS.

Patented Feb. 14, 1950

2,497,272

UNITED STATES PATENT OFFICE 2,497,272

CREST VOLTMETER

Challenor W. Rainey, Ann Arbor, Mich., assignor to Ford Motor Company, Dearborn, Mich., a corporation of Delaware Application February 19, 1947, Serial No. 729,617

2 Claims. (Cl. 250—38)

This invention relates to electrical testing apparatus; and, more particularly, to an adjustable spark gap of the type having utility in the testing of automotive ignition coils.

The routine testing of the efficiency of automotive ignition systems requires checking of the ignition coil which forms a component of such systems. This is customarily done through the use of an adjustable spark gap to determine the maximum air gap across which the coil will discharge as an indication of its operating characteristics. The measurement is not, of course, extremely critical but is merely indicative of the state of the coil. Nor is the equipment, customarily used in this operation, very complex or highly accurate, since precision measurement of a high order is not required. Thus, a number of adjustable spark gaps will occur to those versed in this art and most of them may be used with minor modification for this purpose. The difficulty in using such devices and the disadvantage which this invention is designed to overcome is that of keeping the spark gaps clean and in uniform adjustment while in use. It will be understood that this is not the type of equipment which is found, primarily, in laboratories; but which, rather, is used in automotive garages where it is exposed to dust and dirt and considerable rough handling. It is imperative that the gap electrodes be accessible for easy and speedy cleaning to insure relative accuracy of results and that they be maintained in proper relative position throughout the life of the apparatus.

An advantage of this construction is that an adjustable spark gap has been devised in which the electrodes may be readily cleaned. A further advantage is that the electrodes may be automatically locked in a predetermined zero position after such cleaning without the exercise of any particular skill or care. Yet another advantage of the construction is that the electrodes are of such substantial size and disposition that deterioration of them in use is held to a minimum. Another advantage which will appear to those versed in the art is that the adjustable spark gap is extremely simple in operation and economical in manufacture. Another advantage is that, due to the shape of the electrodes, a preferred range of gap distances is obtained so that quite precise readings are available through the critical range of discharge.

Other advantages will be readily apparent to those familiar with the devices now in use in this field by comparing them with the structure described in this specification, claimed in the appended claims and shown in the accompanying drawings, in which:

Figure 1:
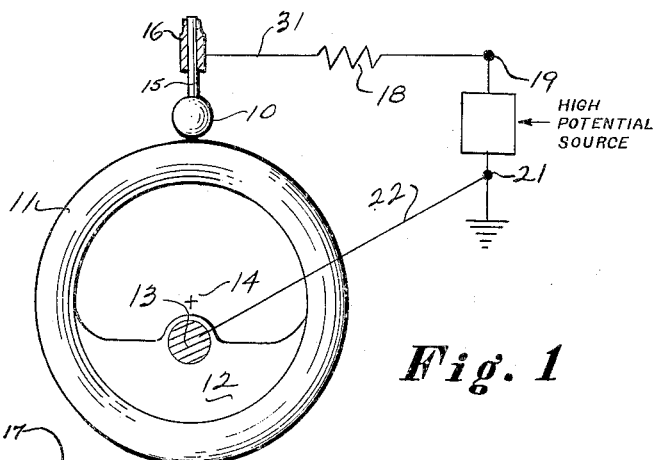
Figure 1 is a view, largely schematic, of the associated electrodes and the electrical wiring system.

Referring first to Figure 1, the essential components of the device include a spherical electrode 10 and a toric electrode 11 having a partial web 12 in its lower section by means of which it is mounted to the shaft 13 which is eccentrically disposed with respect to the principal axis of rotation of the tore indicated at 14. The spherical electrode 10 is mounted on a pin 15 which is slidably received in a spring collet 16, the upper portion of which is of reduced thickness and has a slot 17 (see Figure 4) frictionally engaging the pin 15 and tending to hold it and the associated spherical electrode 10 in any desired position of adjustment in the collet 16.

A typical electrical circuit is shown in Figure 1, there being a current limiting resistor 18 interposed between the spherical electrode 10 and the terminal 19 while the toric electrode 11 is connected to the second terminal 21 by the lead 22 and thence to the ground. It will be understood that the high potential source to be tested is connected with the first and second coil terminals 19 and 21 when the toric electrode 11 has been rotated 180° from the position shown in Figure 1—thus obtaining the maximum spark gap, the high potential source is then activated and the toric electrode 11 is then rotated until discharge occurs between it and the spherical electrode 10 indicating the maximum effective spark gap and serving as an indication of the crest voltage of the source.

Figures 2, 4:
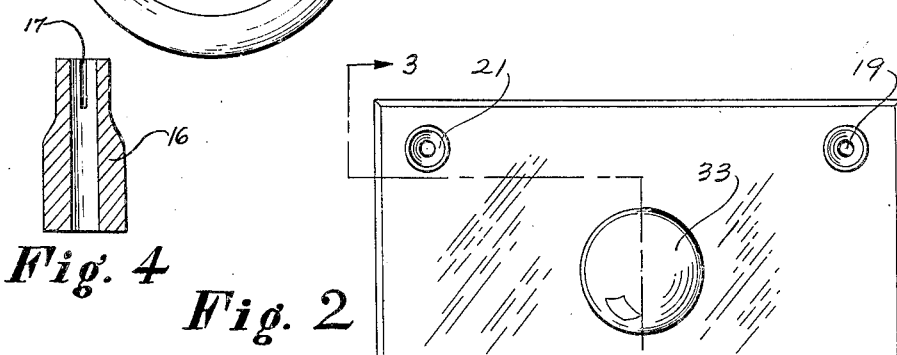
Figure 2 is a plan view of the face of the instrument taken as indicated by the line 2—2 of Figure 3.
Figure 4 is a longitudinal section through the collet on an enlarged scale.
Figure 3:
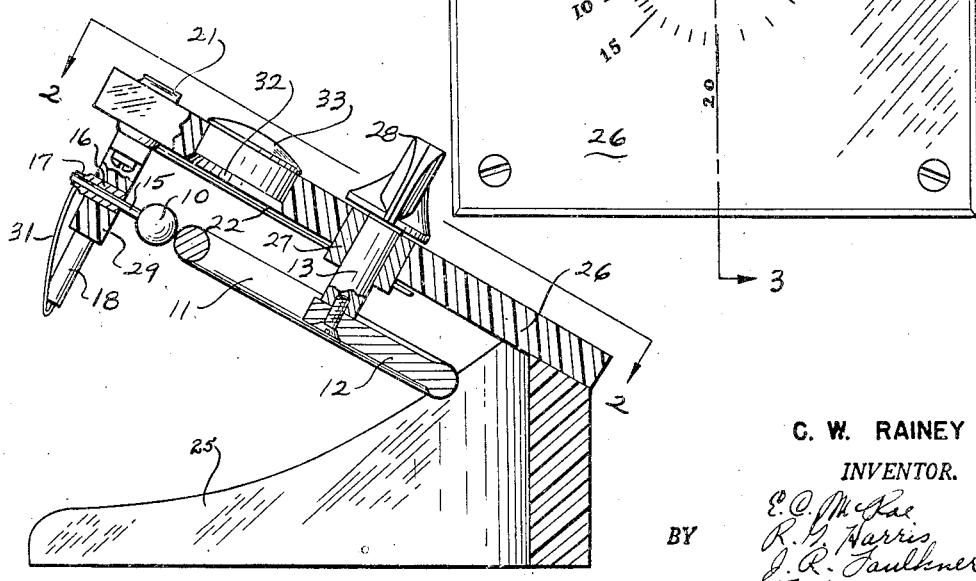
Figure 3 is a vertical transverse section through the instrument taken substantially as indicated by the line 3—3 of the Figure 2.

The device proper is shown in Figures 2 and 3 and comprises a U-shaped base 25 which supports a panel 26 of insulating material arranged at an angle thereto for ease in reading. The electrodes 10 and 11 are arranged beneath the panel 26, the shaft 13 supporting the toric electrode 11 extends through a bushing 27 supported in the panel 26 and terminates in a control knob 28 on the upper surface of the panel and adapted to indicate, by means of suitable graduations on the face of the panel, the relative displacement of the toric electrode 11 with respect to the spherical electrode 10. The latter is slidably received in the collet 16 mounted in the boss 29 secured to the back of the panel 26 adjacent its upper edge and axially aligned with the principal plane of the toric electrode 11. A lead 31 extends from the collet 16 to the resistor 18 and thence to the first coil terminal 19, while the strip lead 22 extends from the bushing 27 to the second coil terminal 21. An opening 32 in the panel 26 provides visual access to the area of critical displacement between the two electrodes and permits observation of them to determine when discharge occurs. A lens 33 is mounted in this opening to assist in this observation.

The operation of the device should be quite clear from the foregoing and attention is now directed to the ease with which it may be cleaned and readjusted. The toric electrode may be readily detached from the shaft 13 and its surface buffed to remove any accumulation of foreign matter or any inequalities due to the arcing. At the same time the spherical electrode 10 may be withdrawn from the collet 16 and similarly treated. The resetting of the device is extremely easy and gives accurate results even though there has been considerable wear of either or both electrodes. To effect this, the pin 15 is reinserted in the collet 16 and the toric electrode 11 is reattached to the shaft 13 while the latter is rotated to a position substantially 180° from that shown in Figure 1 giving the maximum relative displacement. The spherical electrode 10 is then pulled inwardly—i. e., toward the shaft 13, so that it occupies a position substantially more advanced than it will have when in contact with the toric electrode in the position of minimum displacement. The shaft 13 is then rotated 180 degrees to the position shown in Figure 1. This forces the spherical electrode 10 associated with the pin 15 outwardly until it reaches the position shown in Figure 1 when the two electrodes are again in contact in the position of minimum relative displacement. The spring collet 16 secures the pin 15 in this position so that the spherical electrode is thereafter properly held at the zero point despite any diminution in dimension in either of the two co-operating elements. Thus, it is extremely simple to clean the device and it may be reset with considerable accuracy without the use of particular skill or measurements.

The advantage of this construction should be quite clear to those who know the practicable difficulties met in the maintenance and operation of adjustable spark gaps in this particular field. It is to be observed that the device is extremely sturdy and economical to manufacture, may be readily cleaned, and easily reset to a proper adjustment with a minimum of time and skill.

It will be realized that certain changes may be made in the construction shown herein and it is the intention to cover by the claims such of these variations as are reasonably included within the scope thereof.

The invention claimed is:

1. In a variable spark gap, a panel, a shaft rotatably mounted in said panel, a first relatively movable electrode comprising a tore secured to one end of said shaft at a point spaced from the geometrical center of said tore, a second relatively fixed spherical electrode mounted on a pin, said pin being slidably received in a sleeve mounted on said panel and so disposed that the longitudinal axis of said pin substantially coincides with the principal plane of said tore and is normal to and intercepts said shaft, said sleeve including resilient means engaging said pin and normally urging it to maintain a selected position therein, and indicating means on the face of said panel showing the relative displacement between said electrodes as said tore is rotated about the eccentric axis afforded by said shaft.

2. In a variable spark gap, a panel, a shaft rotatably mounted in said panel, a first relatively movable electrode comprising a tore secured to one end of said shaft at a point spaced from the geometrical center of said tore, a second relatively fixed spherical electrode mounted on a pin, said pin being slidably received in a sleeve mounted on said panel and so disposed that the longitudinal axis of said pin substantially coincides with the principal plane of said tore and is normal to and intersects said shaft, said tore and said spherical electrode being arranged so that a complete revolution of the tore will cause the sphere to assume the correct position for operation, said sleeve including resilient means engaging said pin and normally urging it to maintain a selected position therein, and indicating means on the face of said panel showing the relative displacement between said electrodes as said tore is rotated about the eccentric axis afforded by said shaft.

CHALLENOR W. RAINEY.

REFERENCES CITED

The following references are of record in the file of this patent:

UNITED STATES PATENTS

| Number | Name | Date |
| --- | --- | --- |
| 895,752 | Heddaeus et al. | Aug. 11, 1908 |
| 1,574,472 | Elliott | Feb. 23, 1926 |
| 2,135,353 | Rorden | Nov. 1, 1938 |
| 2,292,905 | Towne | May 12, 1942 |